US009629461B2

(12) United States Patent
Egger (10) Patent No.: US 9,629,461 B2
(45) Date of Patent: Apr. 25, 2017

(54) DEVICE FOR INFLUENCING THE MOVEMENT OF A FURNITURE PART, GUIDE UNIT FOR GUIDING THE MOVEMENT OF A FURNITURE PART, AND ITEM OF FURNITURE

(71) Applicant: GRASS GMBH, Hoechst (AT)

(72) Inventor: Remo Egger, Langenegg (AT)

(73) Assignee: Grass GmbH, Hoechst (AT)

( * ) Notice: Subject to any disclaimer, the term of this patent is extended or adjusted under 35 U.S.C. 154(b) by 0 days.

(21) Appl. No.: 15/232,990

(22) Filed: Aug. 10, 2016

(65) Prior Publication Data

US 2016/0345733 A1 Dec. 1, 2016

Related U.S. Application Data

(63) Continuation of application No. 14/309,100, filed on Jun. 19, 2014, which is a continuation of application No. PCT/EP2012/005285, filed on Dec. 20, 2012.

(30) Foreign Application Priority Data

Dec. 23, 2011 (DE) .................. 10 2011 122 266

(51) Int. Cl.
*A47B 95/00* (2006.01)
*A47B 88/04* (2006.01)
(Continued)

(52) U.S. Cl.
CPC ...... *A47B 88/0481* (2013.01); *A47B 88/0477* (2013.01); *F16C 29/02* (2013.01); *F16C 29/10* (2013.01)

(58) Field of Classification Search
CPC .............. A47B 88/047; A47B 88/0477; A47B 88/0481; E05F 1/16
(Continued)

(56) References Cited

U.S. PATENT DOCUMENTS 6,846,053 B2  1/2005 Salice
7,384,108 B2  6/2008 Lam et al.
(Continued)

FOREIGN PATENT DOCUMENTS

DE  20 2009 005 009 U1  4/2010
DE  10 2009 026 260 A1  2/2011
(Continued)

OTHER PUBLICATIONS

German Search Report (Application No. 10 2011 122 266.2) dated Nov. 22, 2012.
(Continued)

*Primary Examiner* — Leslie A Nicholson, III
*Assistant Examiner* — Kimberley S Wright
(74) *Attorney, Agent, or Firm* — Burr & Brown, PLLC (57) ABSTRACT

A device for influencing the movement of a furniture part movably accommodated on a basic furniture structure via a guide unit, the device including a basic component which is assigned to the guide unit and on which a pushing-out device and a retraction device are present so that, in a mounted state of the device, the furniture part can be pushed out from a closure position on the basic furniture structure in a first direction of movement under an action of the pushing-out device, and the furniture part can be retracted from an open position on the basic furniture structure in a second direction of movement under an action of the retraction device, and a charging mechanism for charging the force accumulator, the pushing-out force accumulator is charged by a movement of the housing component of the pushing-out device relative to the basic component.

5 Claims, 3 Drawing Sheets

(51) Int. Cl.
*F16C 29/02* (2006.01)
*F16C 29/10* (2006.01)

(58) Field of Classification Search
USPC .............................................. 312/333, 319.1
See application file for complete search history.

(56) References Cited

U.S. PATENT DOCUMENTS

| | | | |
|---|---|---|---|
| 7,472,973 | B2 | 1/2009 | Huang |
| 7,854,485 | B2 | 12/2010 | Berger |
| 8,100,487 | B2 | 1/2012 | Liang et al. |
| 8,136,898 | B2 | 3/2012 | Ruter |
| 8,172,345 | B2 | 5/2012 | Liang et al. |
| 8,235,478 | B2 | 8/2012 | Zimmer et al. |
| 8,449,051 | B2 | 5/2013 | Lam et al. |
| 8,511,763 | B2 | 8/2013 | Salice |
| 8,632,142 | B2 | 1/2014 | Park et al. |
| 8,668,288 | B2 | 3/2014 | Salice |
| 8,678,528 | B2 | 3/2014 | Domenig et al. |
| 8,721,011 | B2 | 5/2014 | Salice |
| 8,764,134 | B2 | 7/2014 | Salice |
| 8,833,878 | B2 | 9/2014 | Lam et al. |
| 2006/0186772 | A1 | 8/2006 | Lam et al. |
| 2006/0279186 | A1 | 12/2006 | Lam et al. |
| 2007/0103041 | A1 | 5/2007 | Kropf et al. |
| 2008/0247812 | A1 | 10/2008 | Embacher |
| 2009/0072687 | A1 | 3/2009 | Fitz |
| 2009/0273263 | A1 | 11/2009 | Berger |
| 2010/0293746 | A1 | 11/2010 | Johansson et al. |
| 2011/0012488 | A1 | 1/2011 | Liang et al. |
| 2011/0037366 | A1 | 2/2011 | Lam et al. |
| 2011/0115353 | A1 | 5/2011 | Domenig et al. |
| 2011/0129172 | A1 | 6/2011 | Liang et al. |
| 2011/0156561 | A1 | 6/2011 | Salice |
| 2011/0210653 | A1 | 9/2011 | Salice |
| 2011/0254416 | A1 | 10/2011 | Salice |
| 2012/0038255 | A1 | 2/2012 | Netzer et al. |
| 2013/0076218 | A1 | 3/2013 | Radusin |
| 2013/0076219 | A1 | 3/2013 | Lam et al. |
| 2013/0134852 | A1 | 5/2013 | Salice |
| 2014/0097732 | A1 | 4/2014 | Xiao |

FOREIGN PATENT DOCUMENTS

| | | |
|---|---|---|
| DE | 20 2009 005 119 U1 | 2/2011 |
| EP | 2 201 863 A1 | 6/2010 |
| EP | 2 279 680 A1 | 2/2011 |
| WO | 2007/068019 A1 | 6/2007 |

OTHER PUBLICATIONS

International Search Report and Written Opinion (Application No. PCT/EP2012/005285) dated Jun. 25, 2013.

DEVICE FOR INFLUENCING THE MOVEMENT OF A FURNITURE PART, GUIDE UNIT FOR GUIDING THE MOVEMENT OF A FURNITURE PART, AND ITEM OF FURNITURE

CROSS REFERENCE TO RELATED APPLICATIONS

This application is a continuation of U.S. application Ser. No. 14/309,100 filed Jun. 19, 2014, which in turn is a continuation of International Application No. PCT/EP2012/005285 filed Dec. 20, 2012, which designated the United States, and claims the benefit under 35 USC §119(a)-(d) of German Application No. 10 2011 122 266.2 filed Dec. 23, 2011, the entireties of which are incorporated herein by reference.

FIELD OF THE INVENTION

The present invention relates to a device for influencing movement of a furniture part, guide unit for guiding the movement of a furniture part, and an item of furniture.

BACKGROUND OF THE INVENTION

In the furniture sector, different arrangements for influencing the movement or for guiding the movement of a furniture part which is accommodated movably on a basic furniture structure are known.

With regard to a desired ease of operation and supplied auxiliary functions for a user, functions which can facilitate an action of the user on the furniture part or can reduce the action to a minimum, in particular, in connection with the opening, closing or stopping of the furniture part moving in an opening or a closure direction, are of particular interest. Further aspects are focused, for example, on enabling a largely quiet and material-protecting movement of the furniture part in order to achieve a long service life of the components.

Of central importance in this connection are what are referred to as retracting or closure devices and pushing-out or opening devices, which preferably act automatically or in an automated manner in predeterminable operating phases.

Retracting devices serve, for example, in particular for the automated, complete retraction or closure of the furniture part in a final portion of a movement path relative to a basic furniture structure, on which the furniture part is accommodated so as to be movable in a guided manner.

For an opening direction opposed to the closure direction, use is made of opening devices, in particular in order, in the closed state of the furniture part relative to the basic furniture structure, to move the furniture part out somewhat in the opening direction following a triggering action, for example by means of a person acting on the movable furniture part from the outside, where the first partial path of the moving-out action takes place under the action of a pushing-out force accumulator rather than by further assistance from a person.

In the case of the arrangements mentioned, which in particular do not operate with motor drives, use is generally made of a force accumulator which can be repeatedly discharged to dissipate the force and charged again by an action of a force to be applied.

SUMMARY OF THE INVENTION

It is the object of the present invention to enable user-friendly use of items of furniture or furniture parts in the furniture sector, in particular, as far as the operating procedures for a user in conjunction with charging scenarios of corresponding force accumulators are concerned.

The invention is first of all based on a device for influencing the movement of a furniture part which is accommodated movably on a basic furniture structure of an item of furniture via a guide unit, wherein the device comprises a basic component which is assigned to the guide unit and on which a pushing-out device and a retraction device are present in such a manner that, in the mounted state of the device on the item of furniture, the furniture part can be pushed out from a closure position on the basic furniture structure in a first direction of movement under the action of a pushing-out force accumulator of the pushing-out device, and that the furniture part can be retracted from an open position on the basic furniture structure in a second direction of movement opposed to the first direction of movement under the action of a retraction force accumulator of the retraction device, and a charging mechanism for charging the force accumulator.

The basic component can be connected fixedly or releasably to the guide unit. In particular, the basic component can be assigned to a part of the guide unit, such as, for example, a basic-structure rail of a rail guide, i.e. can be connected to the part, the part being attached in a fixed position on the basic furniture structure. This does not exclude the basic component being provided, for example, in the vicinity of the basic-structure rail, for example, being accommodated on the basic furniture structure.

A retraction or pushing-out force accumulator is understood in particular as meaning a mechanical force accumulator, for example, a spring arrangement or a spiral spring or another spring. The state of the force accumulator can depend in particular on the form of the force accumulator or on a state of stress thereof determined by the form.

Within the context of the invention, a force accumulator is not, in particular, an electric motor system or an electric motor or a part thereof.

The furniture part includes, in particular, a part of an item of furniture that is mounted pivotably and/or displaceably on a basic furniture structure, in particular, a drawer, a sliding element, a door, a flap or the like.

A first essential aspect of the invention consists in that the pushing-out device has a housing component which is different from the basic component and on which the pushing-out force accumulator is accommodated, wherein the pushing-out device is mounted displaceably on the basic component in such a manner that the pushing-out force accumulator is charged by a movement of the housing component relative to the basic component.

According to the invention, the device for influencing the movement is therefore firstly of compact design and secondly can be realized with a simple and reliable mechanism in particular as far as the part of the pushing-out device is concerned. It is particularly advantageous that comparatively small restoring forces for restoring at least the pushing-out force accumulator, in order to bring the latter from a discharged or partially discharged state into a charged state, can therefore be realized. The driving force for the charging operation can be applied by the user, which generally takes place by the user moving the furniture part.

In addition, with the possibility of the displaceability or of the relative movement of the housing component of the pushed-out device in relation to the basic component, different charging mechanisms can be utilized. In particular, advantageous charging mechanisms can be set up, since the pushing-out housing component is optionally movable with respect to the basic component or, in the state in which the displaceability is blocked, remains in a fixed position relative to the basic component.

In an advantageous manner, a first bearing point of the pushing-out force accumulator is fixed to the housing component of the pushing-out device and a second bearing point of the force accumulator is guided movably relative to the housing component of the pushing-out device, optionally on the housing component. The second bearing point is thus variable with respect to the housing component of the pushing-out device and, via the displaceability of the housing component, additionally with respect to the basic component. This is of particular importance for interaction with preferred force accumulators, the force accumulator state of which depends on the length of the force accumulator, as is the case with, for example, spiral springs.

Overall, the arrangement according to the invention permits a high degree of variability of the kinematics of the components concerned, which can be realized structurally using simple means and, for a user, permits a force-saving charging of the discharged force accumulator. This is explained in more detail in particular in the detailed description and the figures.

In the charged and thereby secured state of the pushing-out force accumulator, the pushing-out force accumulator is immediately and directly available for a pushing-out action on the furniture part as soon as the secured state is canceled.

It is also of advantage here that, in the charged state of the pushing-out force accumulator, the pushing-out force accumulator is movable relative to the basic component together with the housing component of the pushing-out device. This permits a further flexible control to the effect that the charging of the pushing-out force accumulator also includes the possibility of displacing the housing component of the pushing-out device. In the case of a non-displaceable housing component of the pushing-out device, only the adjustment of the variable bearing point of the spiral spring remains for the lengthening, for example, of a spiral spring, permitting only limited charging mechanisms up to now. In contrast, the present invention provides a charging of the pushing-out force is significantly improved.

When the variable bearing point of the pushing-out force accumulator is fixable at a location which lies outside the housing component of the pushing-out device, i.e., for example, a position in the fixed location on the basic component or a location on another part of the device for influencing the movement, the displaceability of the housing component of the pushing-out device in relation to the basic component advantageously also makes it possible for a corresponding movement of the housing component of the pushing-out device, and therefore for the fixed bearing point of the pushing-out force accumulator to bring about charging of the pushing-out force accumulator, for example, by extending a spiral spring. This is because the two bearing points of the pushing-out force accumulator thereby move away from each other.

There are various possibilities according to the present invention for charging the force accumulator, where the variable bearing point moves or is in a fixed position, in the same manner as the fixed bearing point which is coupled fixedly to the housing component of the pushing-out device. In addition, according to the present invention, the displaceability of the housing component of the pushing-out device and also the variable bearing point of the force accumulator can take place in interaction with other displaceable or movable components in the vicinity of the pushing-out device, for example, together with the guide unit or with parts of the basic component, such as, for example, components of the retraction device. This advantageously permits a multiplicity of different charging mechanisms.

The movement of the housing component of the pushing-out device relative to the basic component should be understood as meaning a consciously implemented bearing movement of the housing component over a crucial distance relative to the basic component. Crucial means, for example, that the housing component of the pushing-out device is displaceable in relation to the basic component over a distance lying within the region of half the length of the housing component, where the length of the housing component is in the direction of movement of the housing component relative to the basic component.

The displacement of the housing component of the pushing-out device in particular does not have anything to do with a possibly slight movement on account, for example, of a minimally present bearing play of the pushing-out device or even a movement on account of the flexibility, which is inherent to each component, under load. The same also applies in conjunction with the displaceability, which is discussed further below, of a base component of the retraction device.

In an advantageous manner, according to the present invention, it is possible, in particular, during a closure movement of the furniture part, that the restoring or charging forces for the charging of the pushing-out force accumulator, and also of the retraction force accumulator do not have to be applied, when the forces are already present in the charged state. A user will find this agreeable, since the user does not have to push the furniture part to a correspondingly powerful extent in the closure direction. A user does not find this critical when drawing out or moving out the furniture part after the end of the pushing-out operation via the pushing-out device, since the user in any case anticipates using force to further open the furniture part. At the end of the pushing-out operation, there is optionally still a small amount of kinetic energy in the decelerating furniture part, and therefore the manual further movement can be facilitated, since at least no static friction has to be overcome.

The pushing-out operation with the pushing-out device is coordinated in such a manner that the furniture part moves out of the closed closure position only by, for example, a few centimeters, whereas, for use of the furniture part, the latter has to be opened further manually by a multiple thereof, for example, by approximately 60 centimeters. With regard to the entire force, which is to be applied by the user, for further opening the furniture part, the portion of force which is to be applied for charging the pushing-out and/or the retraction force accumulator moreover can be kept comparatively small by the arrangement according to the present invention of the charging mechanism thereof, which is also explained more further below.

A further essential aspect of the invention consists in that the retraction device has a base component which is different from the basic component and on which the retraction force accumulator is accommodated, where the retraction device is mounted displaceably on the basic component in such a manner that the retraction force accumulator is charged by a movement of the base component relative to the basic component in one direction of movement, for example, an opening direction of the furniture part (i.e., first direction of movement).

Fundamental aspects are also valid in a corresponding manner for the retraction device or the base component thereof, as far as the displaceability of the housing component of the pushing-out device in relation to the basic component is concerned. In an advantageous manner, the retraction force accumulator is charged by a movement of the base component in the opening direction of the furniture part. This is because, by coupling the base component to an element moving in the opening direction, a charging mechanism which is simple and can be set up in a flexible manner is possible. In addition, for temporary direct or indirect coupling, different elements which move in the opening direction, such as, for example, parts of the guide unit of the furniture part or of the pushing-out device, are basically available. The parts to be coupled should be located only in the vicinity of the base part or, if located remote therefrom, should be able to be coupled to the base part via intermediate elements.

In principle, it is open, according to the present invention, whether the housing component of the pushing-out device and/or the base part of the retraction device are permanently moved from the beginning to the end of a charging operation of the pushing-out and/or of the retraction force accumulator, or whether there are phases in which the housing component of the pushing-out device and/or of the base part of the retraction device does not move relative to the basic component. In addition, a movement relative to other components can be considered in detachment therefrom, all combinations are possible in this respect. Overall, it is thereby possible to set up the charging mechanism of the respective force accumulators in an advantageous manner.

In an advantageous manner, a common feature of all of the variants according to the invention is that the charging mechanism is coordinated in such a manner that the two force accumulators are charged in a manner coupled to the further manual opening movement of the furniture part after the pushing-out operation.

A further fundamental aspect of the invention can be seen in that the charging mechanism is configured in such a manner that the force accumulators are charged exclusively via precisely one coupling element with which a temporary coupling between the device and the movable furniture part is realized. The device should be understood as meaning the device for influencing the movement. As a result, the complexity of the movement-influencing device according to the invention for a furniture part can be advantageously reduced.

To date, respectively associated coupling elements, i.e. at least two coupling elements, are known for the coupling for charging the two force accumulators. Precisely one coupling element is assigned to the device for influencing the movement and is configured in particular as a dedicated component and is preferably integral therewith. However, there has to be at least one corresponding mating coupling element which can be coupled to or decoupled again from the precisely one coupling element. The at least one mating coupling element can be present, in particular, on a part of the guide device that is connected to the furniture part, for example, a movement rail. An arrangement of the mating coupling element on the furniture part itself is also not excluded.

In an advantageous manner, the charging mechanism is coordinated in such a manner that the retraction force accumulator is charged by a movement of a coupling element present on the retraction device in the first direction of movement or the opening direction of the furniture part, by means of the coupling, which is implemented here, in a defined manner by attaching the coupling element to the guide unit or movement rail thereof.

It is particularly advantageous if the charging mechanism is coordinated to the effect that the retraction force accumulator and the pushing-out force accumulator are charged simultaneously. The simultaneousness here can prevail from a beginning to an end of the two charging operations, that is to say, the two charging operations run entirely isochronously. Alternatively, it is possible for there to be at least one charging phase in which the two force accumulators run in parallel or simultaneously, and precisely one force accumulator is charged before and/or after the combined movement, which is more advantageous structurally.

Furthermore, it is proposed that the charging mechanism is designed in such a manner that the retraction force accumulator is charged by the movement of the coupling part of the retraction device and the base component being combined in the first direction of movement. Combined should be understood as meaning, in particular, simultaneousness.

The force to be applied by a user for the charging operation or the corresponding portion during the manual further opening of the furniture part following the pushing-out operation can therefore be kept comparatively low, as far as the absolute or instantaneous force values are concerned.

Therefore, in particular even older people, disabled people or children can easily use the corresponding furniture part or the item of furniture.

This is made possible by the fact that the action of force on the furniture part has to be applied over a larger movement path of the furniture part or, in the event of the same basic opening speeds, over a longer period. This is because, with the combined movement, the base part, by means of the movement thereof in the opening direction, reduces the path covered relative to the base part of the coupling part, which is connected to the retraction force accumulator. With the movement of the coupling part relative to the base part in the opening direction, the retraction force accumulator is lengthened or charged, provided that the base part, to which the retraction force accumulator is attached by the fixed bearing point thereof, does not move or moves more slowly than the coupling part. This is because the coupling part directly or indirectly forms the variable bearing point of the retraction force accumulator.

It is particularly advantageous if the base part, during the movement thereof in the opening direction, is coupled at least over a partial distance to the housing component of the pushing-out device and carries along the housing component, and therefore the fixed bearing point of the pushing-out force accumulator, in the opening direction until a stop position of the housing component is reached, where the pushing-out force accumulator is held with the variable bearing point thereof fixed relative to the basic component. The pushing-out force accumulator is therefore also lengthened in the process and likewise charged. This is possible whenever, in an advantageous manner, the retraction force accumulator provides stronger forces than the pushing-out force accumulator, i.e. the retraction force accumulator also requires higher forces for the charging. The two force accumulators here are lengthened or drawn out serially. In addition to phases of separate drawing out, there are also phases here in which the two force accumulators are charged simultaneously. In accordance with the abovementioned charging mechanism according to the present invention for the combined charging of the two force accumulators, a portion of force, to be applied absolutely or instantaneously, for charging the force accumulators during the further opening of the furniture part is not higher at any time than the maximum force which can be applied and which would be necessary for the sole charging of the stronger force accumulator. With the present invention, a charging force which lies above the charging force for charging the stronger force accumulator advantageously does not need to be applied in any phase, even in the phases of the combined or serial charging of the two force accumulators.

In an advantageous variant of the subject matter of the present invention, a locking device is provided in such a manner that in a starting position of the device, the retraction device can be locked in relation to the basic component. A defined basic state or a defined starting position of the device for influencing the movement can thus be reliably established and maintained. The basic state or the defined starting position arises during normal operation when the furniture part is in a functionally correct closure position in relation to the basic furniture structure during operation. The locking of the retraction device can be implemented in a defined manner and can be canceled again as a function of the position of the furniture part with respect to the basic furniture structure or the state of movement of the furniture part. The locking of the retraction device is advantageous, in particular, when the retraction device constitutes that part of the device for influencing the movement which interacts with the movable furniture part during the opening and during the closure of the furniture part.

In an advantageous manner, the locking of the base component in the starting position of the device can be canceled by a displacement of the retraction device in relation to the basic component in the second direction of movement. The displacement movement of the retraction device in the closure direction is advantageously provided by a movement of the furniture part in the closure direction, since, during normal operation, when the furniture part is closed in relation to the basic furniture body, the device for influencing the movement is in the starting position. In accordance with, for example, known touch-latch arrangements, by the closed furniture part being pressed over a small pressing path in the closure direction, an intuitive operation of the furniture part or of the corresponding movement-influencing device of the furniture part can be used for canceling the locking. In addition, a pushing-out operation is thereby initiated which, in the case of touch-latch arrangements, in any case follows as the next step. The arrangement according to the invention can therefore advantageously be provided with a touch-latch functionality which is known per se, in particular by integration of a touch-latch arrangement in the device according to the present invention, in particular, in the form of a pushing-out device with locking. The locking, which is described above and can be canceled, can be realized, for example, by means of a curved guide and a force-actuated, pivotably displaceable retaining element that interacts with the curved guide in order to set up and to cancel the locking.

For the carrying along of the retraction device in the closure direction when the furniture part is moved inward when, for example, a user presses onto a front of the furniture part, a stop mechanism can be provided between a part of the guide unit that is connected to the furniture part and the retraction device. To cancel the locking, a small triggering path within the millimeter range is generally sufficient, and therefore also the furniture part merely has to be moved by the user in this millimeter range in the closure direction. So that the locking is maintained, a locking force which is preferably provided by the charged pushing-out force accumulator acts on the locking mechanism, wherein the locking force has to be briefly overcome for the inward movement of the retraction device.

In an advantageous modification of the present invention, the pushing-out device and the retraction device are coordinated in such a manner that, after the locking of the base component is canceled, the base component is movable relative to the basic component in the first direction of movement under the action of the pushing-out force accumulator. It is thereby clear that, in the locked state or the starting position of the device, the pushing-out force accumulator is charged, and is in particular ready to push the base component out in the first direction of movement as soon as the locking is canceled. The pushing-out action can take place only if a larger counterforce counter to the first direction of movement does not act on the base part or on the furniture part. The state of affairs is provided since the preceding canceling of the locking by the touch-latch functionality takes place only by the furniture part briefly being pressed. With the movement of the base part in the opening direction, the coupling of the base part to the movable furniture part causes the latter to move over a pushing-out path. This makes it possible for the precisely one coupling element, via which the force accumulators are charged, also to take on the coupling function between the device for influencing the movement of the base part and the movable furniture part during the pushing-out operation. This is advantageous with regard to a compact design and a reduced complexity of the device according to the present invention, in particular, because separate coupling arrangements for the pushing-out operation of the furniture part, on the one hand, and for the charging operation of the force accumulators, on the other hand, do not have to be provided.

It is also of advantage that the pushing-out device and the retraction device are coordinated in such a manner that the base component moves relative to the basic component in the first direction of movement under the action of the pushing-out force accumulator, with the charging state of the retraction force accumulator being maintained. In an advantageous manner, the retraction force accumulator remains discharged, as it advantageously is in the starting position of the device. The entire force which can be provided by the pushing-out force accumulator is thus also actually available for the pushing-out operation. This is significant, in particular, in the case of heavily loaded or large and comparatively heavy furniture parts which are to be pushed out, as far as limit configurations of the pushing-out force accumulator are concerned, and specifically none of the action of force of the pushing-out force accumulator need then be drawn off in order to be able to obtain a desired pushing-out action. It is advantageous, in particular, that the maximum force which can be applied by the pushing-out force accumulator is not used at all for the charging of the discharged retraction force accumulator.

This principle is also implemented when charging the other force accumulator, the pushing-out force accumulator, and therefore, for the charging of the pushing-out force accumulator use is advantageously not made of any portion of force from the retraction force accumulator. Even during the automatic retraction of the furniture part, the available force of the retraction force accumulator is used solely for retracting the furniture part.

The two force accumulators are preferably charged only after the pushing-out operation or on the path of the furniture part into a position in which the furniture part is opened further than at the end of the pushing-out operation. The force required for charging the force accumulators is not provided, and not even proportionally provided, by the other force accumulator, but rather entirely by the user, specifically in interaction with a movement, which is in any case consciously triggered or actively brought about by the user, of the furniture part in the opening direction.

Furthermore, it is advantageous that the pushing-out force accumulator is connected to a movable gripping section which can be brought into contact with a mating section on the base component such that coupling takes place between the pushing-out force accumulator and the base component. In an advantageous manner, the gripping section is present on or in the region of the variable bearing point of the pushing-out force accumulator. After the canceling of the locking of the base component, the pushing-out force can thus act particularly effectively on the base part. The contact and the interaction between the gripping section and the base part can preferably be realized via a mechanical stop present in a fixed manner on the base part. Furthermore, the gripping section can also be used in order to be able to bring the pushing-out force accumulator into contact with at least one other mating section, wherein the at least one other mating section is not present on the base part, but rather, for example, on the basic component.

It is also advantageous that the housing component is movable relative to the basic component in a manner limited via stops on the basic component. The formation of stops is a measure of little complexity in order to reliably predetermine a relative movement between the housing component of the pushing-out device and the basic component in a defined manner or to predetermine free wheels and mechanical stops. In particular, this is advantageous when the component concerned consists of a flat or profiled element made from a metallic material or plastics material. In principle, it is also possible to provide stops on other component sections of the device according to the present invention for influencing the movement, for example, optionally not for the housing component, but rather for other parts, for example, in order to predetermine standstill positions or else the movement positions of the parts, which relate to the situation in which the stop moves automatically. A stop can be present on a fixed component, the basic component, or on a component which is displaceable with respect to the basic component or is mounted movably thereon, such as on the housing component, the base component or the variable bearing points of the force accumulators, for example.

It is also advantageous that the pushing-out device and the retraction device are designed in such a manner that, when the retraction device moves in the second direction of movement, movement coupling to the pushing-out device takes place, with the retraction device and the pushing-out device passing into a stop position in relation to the basic component.

This relates, in particular, to an operating state in which the furniture part is moved from an open position toward the basic structure again, i.e. is closed, where the retraction device is carried along in the closure direction or the second direction of movement via the coupling element. The interaction of the retraction device with the furniture part, or with a part of the guide unit assigned to the furniture part, such as, for example, a movement rail of a drawer rail guide, via the coupling element leads to the entire retraction device with the charged retraction force accumulator being moved without the retraction force accumulator being triggered or activated. The pushing-out device is likewise carried along in the closing movement process without the pushing-out force accumulator, which is likewise charged, being triggered or activated. Only the movement of the retraction device and the pushing-out device into the stop positions on the basic component in accordance with the starting position of the device for influencing the movement takes place. When the stop position is reached, the effect is also achieved that, since the retraction device is automatically locked in relation to the basic component, which takes place via the locking device, in the locked position the retraction device takes up the starting position exactly. The stop position of the retraction device on the basic component generally differs slightly, for example, by a few millimeters, from the starting position which then arises and is spaced apart by this amount in the opening direction from the stop position. This distance corresponds, in particular, to a provided pressing path when the furniture is pressed by a user in the closed position in accordance with the touch-latch functionality, in anticipation of the furniture part subsequently moving out.

The invention also relates to a guide unit for guiding the movement of a furniture part which can be accommodated movably on a basic furniture structure of an item of furniture via the guide unit, where the guide unit has a device for influencing the movement according to one of the variants mentioned above. The corresponding advantages can therefore be realized in a guide unit. A suitable guide unit, for example, for drawers and the like, is a rail guide with telescopic rails, for example, a partial extension mechanism or a full extension mechanism with a basic-structure rail, central rail and movement rail.

In addition, the present invention relates to an item of furniture with a furniture part which is accommodated movably on a basic furniture structure of the item of furniture, where one of the abovementioned guide units is present. In the case of items of furniture with a sliding furniture part, such as drawers, for example, use is generally made of two guide units per sliding furniture part, where one guide unit or both of the guide units can be provided with a device for influencing the movement.

BRIEF DESCRIPTION OF THE DRAWINGS

Further advantages and features of the invention are shown with reference to an exemplary embodiment according to the invention, illustrated schematically in the figures of a guide unit and a device for influencing the movement of a furniture part.

DETAILED DESCRIPTION OF THE INVENTION

Figure 1:
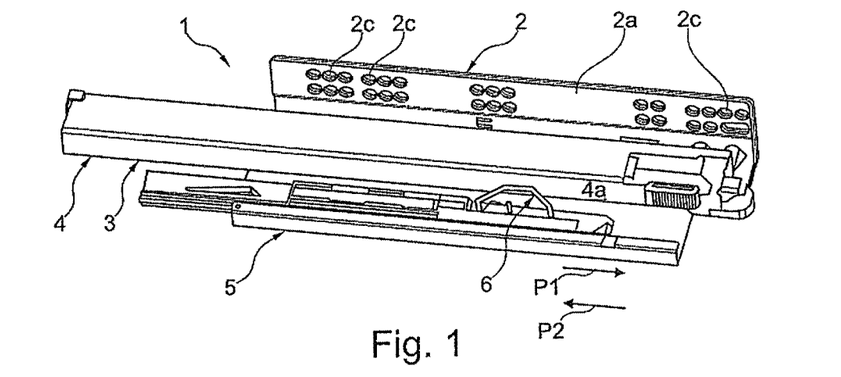
FIG. 1 shows a guide unit according to the present invention with a device according to the invention for influencing the movement of a furniture part.

FIG. 1 shows a guide unit 1 according to the present invention which is designed here, for example, as a full extension mechanism for guiding a drawer or the like in relation to a basic furniture structure, where use is generally made of two guide units per furniture part. The guide unit 1 comprises a basic-structure rail 2, which is assignable to a basic furniture structure, a movement rail 4, which is assignable to a movable furniture part, and a central rail 3 acting in a displaceable manner between the basic-structure rail 2 and the movement rail 4. Via an attachment section 2a, which is oriented vertically in the fitted operating state of the guide unit 1 and has passage openings 2c and other similar openings, the guide unit 1 can be fastened in a horizontally oriented manner, for example, to an inner side of a vertical, first side wall of the basic furniture structure via fastening means (not illustrated). A lower side of a furniture part base can fit on the movement rail 4 in a manner connected thereto and can be mounted via the movement rail 4 on the basic furniture structure in a movable manner. A second guide unit, which is similar to the guide unit 1 or is mirrored with respect thereto, is fastened on a side wall of the basic furniture structure that is opposite the first side wall for an additional or two-sided mounting of the furniture part at the same vertical height on the basic furniture structure, and therefore the furniture part is mounted on the basic furniture structure so as to be displaceable via the two guide units in a first direction of movement or opening direction, according to the arrow P1, and in a second direction of movement or in the closure direction, according to the arrow P2.

This sense of direction is also the basis of the description of the device for influencing the movement that is discussed further below.

The central rail 3 cannot be seen in FIG. 1 because it is covered by sections of the movement rail 4. A device according to the present invention for influencing the movement of a furniture part, which is referred to below as movement device 5, is present on the guide unit 1. The movement device 5 is connected fixedly to the basic-structure rail 2. The movement device 5 extends below the central rail and movement rail 4 to a point beyond a vertical side 4a of the movement rail 4 such that fundamental parts of the movement device 5 are present in a horizontally adjacent manner to the vertical side 4a in order to be able to interact with the movement device 5 in a space-saving manner.

A two-armed, pin-like clip 6 is connected fixedly to the vertical side 4a, the clip 6 being positioned on the movement rail 4 for a specifically coordinated interaction with sections of the movement device 5 with regard to a displacement movement of the movement rail 4 and having a three-dimensionally curved design, with downwardly projecting functional sections or ends which are offset with respect to each other in the direction of movement of the guide unit 1.

FIG. 1 shows the guide unit 1 in the completely pushed-together state and in a starting position of the movement device 5, and this state, during normal operation of the movement device 5, corresponds to a closure position of a furniture part guided by the fitted guide unit 1.

Figure 2:
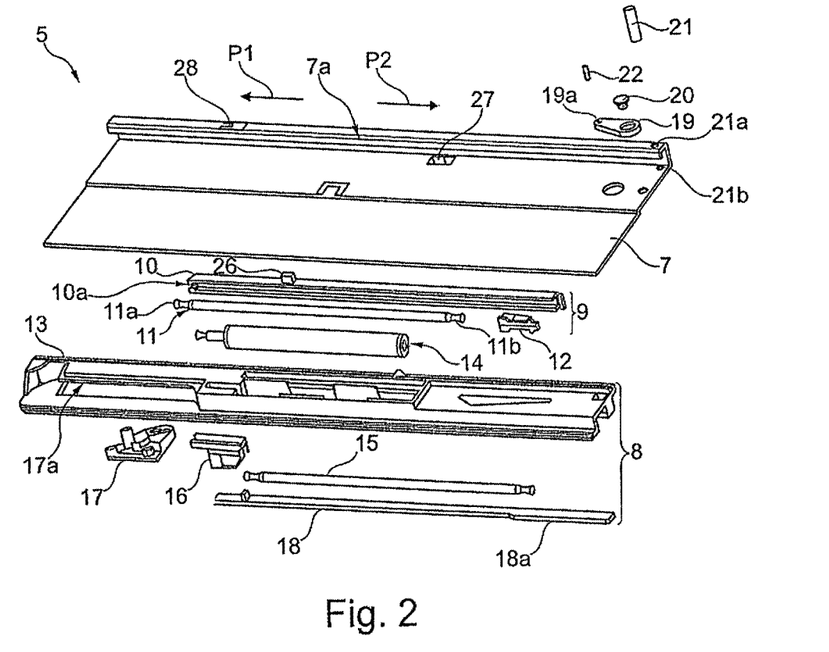
FIG. 2 shows an exploded illustration of the device according to the present invention for influencing the movement of a furniture part according to FIG. 1.

FIG. 2 illustrates the movement device 5 according to the invention in an exploded illustration, but in an orientation rotated through 180 angular degrees about an axis which is vertical to the plane of the image.

FIGS. 3 to 10 show the movement device 5 in the orientation according to the view from FIG. 1 and in operating states, corresponding to a fitted state of the guide unit 1 on an item of furniture.

The movement device 5, which can be attached, for example, releasably or fixedly to the guide unit, comprises a basic component that is designed as a mounting plate 7 on which a retraction device, which is designed as an automatic retraction mechanism 8, and a pushing-out device 9 are accommodated. The pushing-out device 9 comprises the components 10, 11 and 12 and is provided with what is referred to as touch-latch functionality.

The pushing-out device 9 has a touch-latch housing 10 which is of approximately U-shaped design in cross section and has two free limbs between which a pushing-out force accumulator, which is realized by a spiral spring 11, is accommodated. One end 11a of the spiral spring 11, which end is of thickened design in the manner of a knob, is fixedly accommodated on a bearing point 10a at one end of the touch-latch housing 10, with the other end 11b, which forms a variable bearing point of the spiral spring 11, interacting with a hook 12, which is adjustable movably along the touch-latch housing 10.

Figure 10:
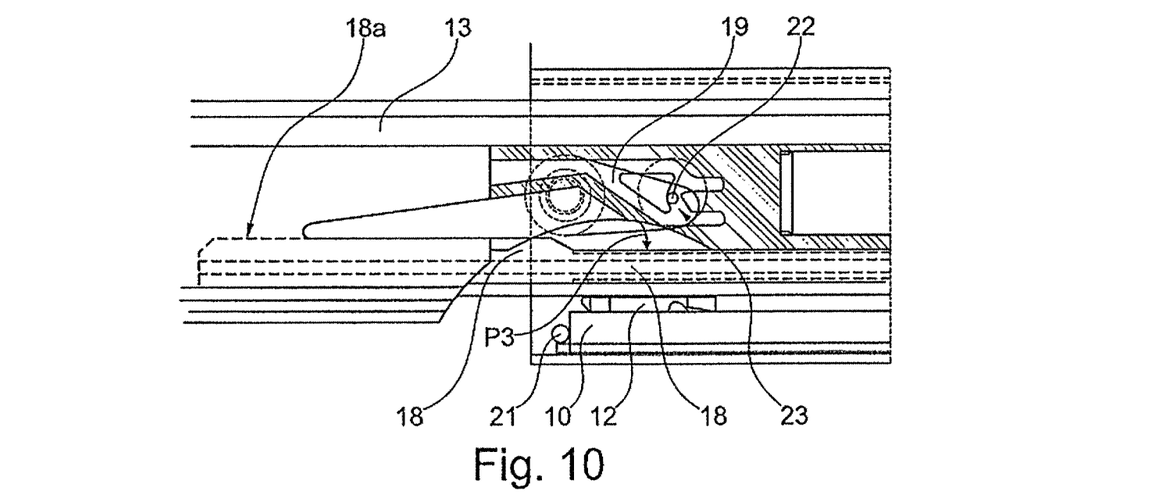

The automatic retraction mechanism 8 comprises, as base part, an automatic retraction housing 13, on which a damper 14 designed as a piston-cylinder unit is inserted, a retraction force accumulator, which is configured as a spiral spring 15 and on the variable bearing point of which an automatic retraction carry-along member 16 is fitted, an automatic retraction hook 17, which is accommodated in an articulated manner on the automatic retraction carry-along member 16, and a control element 18, which is present in a displaceable manner with respect to the automatic retraction housing 13 and is intended for an operating state (described further below) with a spurious triggering situation during operation of the guide unit 1. A radial can or cardioid curve 23 of the touch-latch functionality cannot be seen in FIG. 2, the cardioid curve 23 being formed on the opposite side from the side of the automatic retraction housing 13 that is apparent in FIG. 2. (A cardioid curve 23 is shown in FIG. 10.)

The two force accumulators 11 and 15 can also be considered to be energy accumulators.

In order to lock the position of the automatic retraction housing 13 in relation to the mounting plate 7, a lever 19 or a cardioid bolt 22 inserted thereon at a fastening point 19a interacts with the cardioid curve 23. The lever 19 is pivotable on the mounting plate 7 via a fastening bolt 20. In addition, a stop bolt 21 is fixed in a manner oriented vertically on the mounting plate 7 via openings 21a and 21b. The stop bolt 21 is present in a channel section 7a, which is formed by three respective right-angled bent-over portions of the sheet metal material of the mounting plate 7 and is formed along a longitudinal side of the mounting plate 7. The channel section 7a serves for the laterally delimited longitudinal guidance of the touch-latch housing 10, which is displaceable therein in the direction of P1 and P2.

The function of the guide unit 1 with the movement device 5 is explained below with reference to FIGS. 3 to 7 which show successively occurring operating states during normal operation, with the guide unit 1 not being illustrated.

Figure 3:
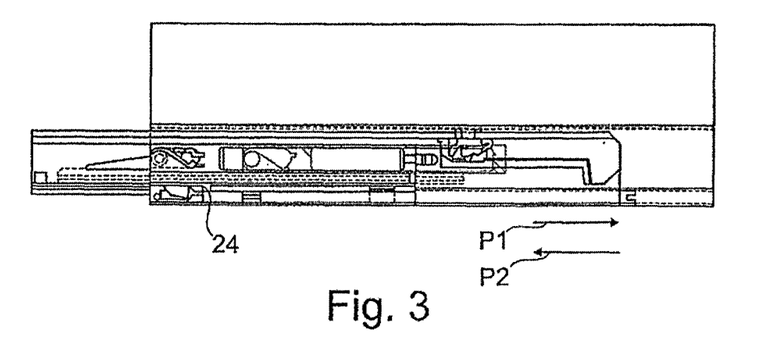
FIGS. 3 to 7 show the device according to the present invention for influencing the movement of a furniture part according to FIG. 2 in the functionally correct interaction of the parts in top view, with component sections which are not visible being partially illustrated by dashed lines.

FIG. 3 shows the state at the beginning and at the end of a complete opening and closure cycle, with FIG. 3 illustrating a starting position of the guide unit 1 according to the present invention and the movement device 5, i.e., for example, in a situation with a completely closed, movable furniture drawer in a basic furniture structure. The opening direction P1 and the closure direction P2 are once again indicated in FIG. 3 for clarification purposes.

In the starting position according to FIG. 3, when the drawer is closed, the movement device 5 or the automatic retraction housing 13 of the automatic retraction mechanism 8 is in a locked state in relation to the mounting plate 7, which takes place via the touch-latch functionality, with the lever 19 or cardioid bolt 22 held in a manner caught against the cardioid curve 23.

By means of the coupling of the movement rail 4 to the automatic retraction mechanism 8 via the clip 6 (only apparent in FIG. 1), the guide unit 1 is likewise locked, and therefore so too is the furniture part or the drawer, in relation to the basic furniture structure.

In this locked state, the drawer cannot readily be opened.

For a release action, the movement rail 4, and therefore the entire automatic retraction mechanism 8 and the automatic retraction housing 13 thereof, is moved by a few millimeters in the direction P2. A user executes the release action by pressing, for example, on a front side of the drawer in accordance with the arrow P2.

As a result, the lever 19 is deflected along the cardioid curve 23 in such a manner that the cardioid bolt 22, which has been locked up to now pressing into a concave cardioid section, comes free from the locking and, under the action of the charged pushing-out force accumulator or the spiral spring 11, the automatic retraction housing 13 is moved in the opening direction P1 and the furniture part is pushed out, which makes the floating mounting of the automatic retraction housing 13 in relation to the mounting plate 7 possible. With the pushing-out operation, the spiral spring 11 is shortened and, in the process, is at least partially discharged. The pushing-out operation takes place by the hook 12 hooking against a laterally protruding projection 24 on the automatic retraction housing 13. The touch-latch housing 10 is pressed rearward or in the direction P2 in the process. The spiral spring 15 is not charged or is not tensioned in this phase.

Figure 4:
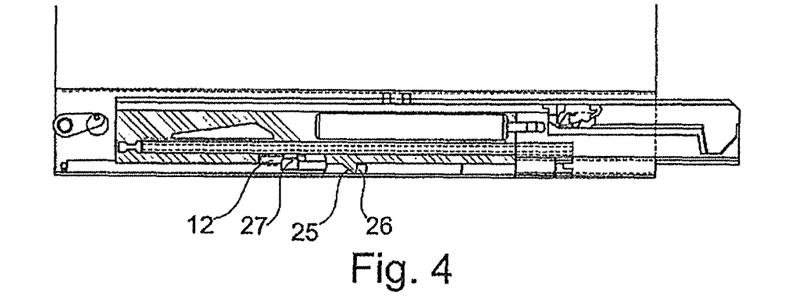

The pushing-out movement takes place until, according to FIG. 4, the hook 12 is present at an upwardly bent-over stop angle 27 and therefore stops the movement rail 4 or the furniture part. The pushing-out operation is ended. In addition, in this position, a lug-like projection 25, which protrudes laterally on the outside of the touch-latch housing 10, is present on a mechanical stop element 26, which is coordinated with the lug-like projection 25, on the touch-latch housing 10.

Figure 5:
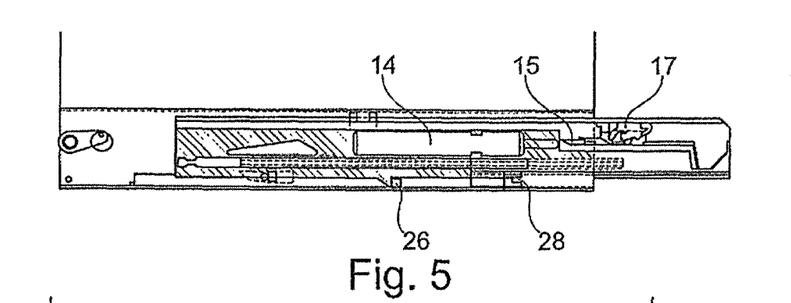

The transition movement operation for restoring or charging of the force accumulators 11, 15 then follows. Since the furniture part is stationary, an operator subsequently opens the furniture part further manually by pulling in the opening direction P1. The automatic retraction hook 17 together with the automatic retraction carry-along member 16 is displaced in the direction P1 by the movement of the movement rail 4, and therefore the spiral spring 15 is lengthened and thus charged (FIG. 5). In addition, a piston rod which emerges from a cylinder housing of the damper 14 and acts on the automatic retraction carry-along member 16 is displaced in the direction P1 and the damper 14 is brought into a dampable state. At the same time or in a combined manner, since the projection 25 carries along the stop element 26, the automatic retraction housing 13 is also displaced in the direction P1 and, in the process, the spiral spring 11 is lengthened and charged. This is because the hook 12 is present with the one end 11b of the spiral spring 11 in a positionally fixed manner on the stop angle 27. Since the spring force of the spiral spring 15 is greater than the spring force of the spiral spring 11, the spiral spring 15 covers less distance back than the spiral spring 11. Accordingly, the charging of the spiral spring 11 is first completely finished before the spiral spring 15 is completely charged.

The movement path of the touch-latch housing 10 along the channel section in the direction P1 is limited in a defined manner by a further stop 28 on the mounting plate 7 by the stop element 26 at the top of the touch-latch housing 10 butting against the stop 28.

At the end of the charging operation of the spiral spring 11, the hook 12 is drawn somewhat out of the touch-latch housing 10, such that the hook 12 can snap into place on the end side of the touch-latch housing 10 and is thereby secured against discharging.

The automatic retraction hook 17, which is guided along a L-shaped guide track 17a on the automatic retraction housing 13, latches, by pivoting in the shorter angled section of the guide track 17a where it reaches its release position with respect to the movement rail 4. The clip 6 on the movement rail is disengaged in the process from the automatic retraction hook 17, such that the drawer can subsequently be moved freely or decoupled from the movement device 5 in the opening direction P1.

Figure 6:
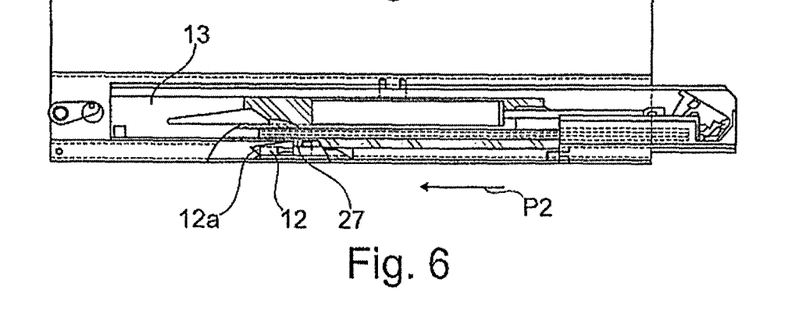

With a closing movement of the drawer, as shown in FIG. 6, the clip 6 on the movement rail 4 reaches the catch region of the automatic retraction hook 17 and carries along the automatic retraction hook 17 in the direction P2, and therefore the entire automatic retraction mechanism 8, by means of the tensioned spiral spring 15 (not shown in FIG. 6). The automatic retraction hook 17 is not yet released here or remains in the latched position in the guide track 17a.

According to FIG. 6, the stop angle 27 strikes against the hook 12, and therefore the tensioned pushing-out device 9 is likewise moved in the direction P2. The two units, the automatic retraction mechanism 8 and the pushing-out device 9, are moved in the direction P2.

The automatic retraction mechanism 8 and the pushing-out device 9 reach the end position. The cardioid bolt 22 is brought into the catch position on the cardioid curve 23. At the same time, the hook 12 or an oblique, rear flank 12a is released by contact with the stop bolt 21, i.e. is brought out of the locking thereof against the touch-latch housing 10 such that the spiral spring 11 applies a force to the automatic retraction housing 13 in the direction P1 and presses again somewhat in the direction P1 until the cardioid bolt 22, acted upon by the spring force and controlled by the cardioid curve 23, is applied to lock the automatic retraction housing 13. The pretensioned spiral spring 11 continues to act here on the locked automatic retraction housing 13 since the hook 12 presses against the stop angle 27.

In the end position, the effect achieved by excess closing energy of the furniture part, for example when moving the drawer in or by closing the drawer with pressure, is that the automatic retraction mechanism 8 is released and the automatic retraction hook 17 is pivoted out of the locked position in the guide track 17a and a damped automatic retraction begins. The movement rail 4 or the furniture part is retracted under the action of the charged spiral spring 15 acting on the automatic retraction hook 17. The excess closing energy is absorbed by the damper 14.

The completely closed end position of the movement rail 4 and of the movable furniture part is reached.

Figures 7, 8:
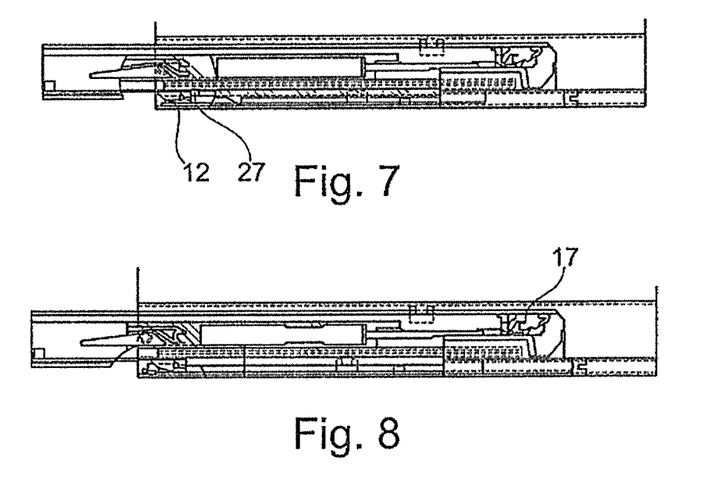
FIGS. 8 to 10 show an illustration of difference phases of a further operating state of the device according to the present invention, where FIG. 10 relates to a detailed illustration.

FIG. 7 shows the automatic retraction mechanism 8 in the starting position or basic position as moved by spiral spring 11. The movement rail 4 is again in the starting position thereof.

Figure 9:
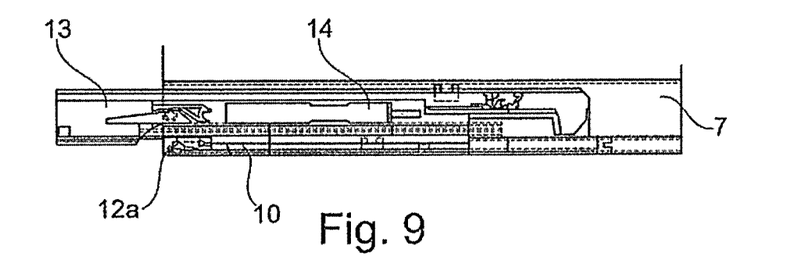

FIGS. 8 to 10 show difference phases of an operating state which can occur irregularly or by misoperation of the furniture part.

Starting from the starting position of the movement device 5, the movement rail 4, or without previous pressing, the furniture part present thereon is drawn in the opening direction P1 in FIG. 8. The touch-latch functionality is therefore circumvented in the process. The damper 14 and the spiral spring 15 are drawn out in the direction P1 via the clip 6 which is coupled to the automatic retraction hook 17 (see FIG. 8). However, the automatic retraction housing 13 is held back by the cardioid bolt 22.

After release of the movement rail 4 as shown in FIG. 9, in the following closing operation of the furniture part, the damper 14 presses the automatic retraction housing 13 back. However, since the control element 18 is not in a release position relative to the automatic retraction housing 13, but rather an expanded section 18a is laterally level with the cardioid curve 23, the cardioid bolt 22 or the lever 19 cannot be pivoted away laterally and therefore also cannot come free from the locking against the cardioid curve 23 (see FIG. 10).

When the basic position (i.e., completely closed) is reached, the control element 18 is maximally displaced in the direction P2 relative to the automatic retraction housing 13, and therefore the lever 19 according to arrow P3 and the cardioid bolt 22 can come free from the cardioid curve 23 (see FIG. 10) when the furniture part is pressed.

LIST OF REFERENCE NUMBERS

1 Guide unit
2 Basic-structure rail
2a Attachment section
2c Passage opening
3 Central rail
4 Movement rail
4a Side
5 Movement device
6 Clip
7 Mounting plate
7a Channel section
8 Automatic retraction mechanism
9 Pushing-out device
10 Touch-latch housing
10a Bearing point
11 Spiral spring
11a, 11b End
12 Hook
12a Rear flank of hook
13 Automatic retraction housing
14 Damper
15 Spiral spring
16 Automatic retraction carry-along member
17 Automatic retraction hook
17a Guide track
18 Control element
18a Expanded section of 18
19 Lever
19a Fastening point
20 Fastening bolt
21 Stop bolt
21a, 21b Openings
22 Cardioid bolt
23 Cardioid curve
24, 25 Projections
26 Stop element
27 Stop angle
28 Stop

The invention claimed is:

1. A device for influencing the movement of a furniture part which is accommodated movably on a basic furniture structure of an item of furniture via a guide unit, the device comprising: a pushing-out device, a retraction device, a basic component which is assigned to the guide unit and on which the pushing-out device and the retraction device are present in such a manner that, in a mounted state of the device on the item of furniture, a movable furniture part can be pushed out from a closure position on the basic furniture structure in a first direction of movement under an action of a pushing-out force accumulator of the pushing-out device, and the furniture part can be retracted from an open position on the basic furniture structure in a second direction of movement opposed to the first direction of movement under an action of a retraction force accumulator of the retraction device, and a charging mechanism for charging at least the retraction force accumulator, wherein the retraction device further comprises a base component which is different from the basic component and on which the retraction force accumulator is accommodated, wherein the retraction device is mounted displaceably on the basic component in such a manner that the retraction force accumulator is charged by a movement of the base component relative to the basic component in the first direction of movement, and wherein the retraction device includes a housing, a damper and a carry along member that is fitted on a variable bearing point of the retraction force accumulator.

2. A device for influencing the movement of a furniture part which is accommodated movably on a basic furniture structure of an item of furniture via a guide unit, the device comprising: a pushing-out device, a retraction device, a basic component which is assigned to the guide unit and on which the pushing-out device and the retraction device are present in such a manner that, in a mounted state of the device on the item of furniture, a movable furniture part can be pushed out from a closure position on the basic furniture structure in a first direction of movement under an action of a pushing-out force accumulator of the pushing-out device, and the furniture part can be retracted from an open position on the basic furniture structure in a second direction of movement opposed to the first direction of movement under an action of a retraction force accumulator of the retraction device, and a charging mechanism for charging the pushing-out force accumulator and the retraction force accumulator, wherein the charging mechanism is configured in such a manner that the pushing-out force accumulator and the retraction force accumulator are charged exclusively via precisely one coupling element with which a temporary coupling between the device and the movable furniture part is realized, and wherein the retraction device includes a housing, a damper and a carry along member that is fitted on a variable bearing point of the retraction force accumulator.

3. The device as claimed in claim 2, wherein the charging mechanism is coordinated in such a manner that the retraction force accumulator and the pushing-out force accumulator are charged simultaneously.

4. The device as claimed in claim 2, wherein the locking of the base component of the retraction device in the starting position of the device is canceled by a displacement of the retraction device in relation to the basic component in the second direction of movement.

5. The device as claimed in claim 4, wherein the pushing-out device and the retraction device are coordinated in such a manner that, after the locking of the base component of the retraction device is canceled, the base component is movable relative to the basic component in the first direction of movement under the action of the pushing-out force accumulator.

* * * * *